(12) United States Patent
Bachmaier et al.

(10) Patent No.: US 9,254,755 B2
(45) Date of Patent: Feb. 9, 2016

(54) METHOD AND APPARATUS FOR INDUCTIVELY CHARGING THE ENERGY STORAGE DEVICE OF A VEHICLE BY ALIGNING THE COILS USING HEAT SENSORS

(71) Applicant: SIEMENS AKTIENGESELLSCHAFT, Munich (DE)

(72) Inventors: Georg Bachmaier, Munich (DE); Christian Bachmann, Munich (DE); Dominik Bergmann, Sachsenkam (DE); Marco Cyriacks, Munich (DE); Reinhard Freitag, Munich (DE); Matthias Gerlich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 13/930,330

(22) Filed: Jun. 28, 2013

(65) Prior Publication Data

US 2014/0002016 A1 Jan. 2, 2014

(30) Foreign Application Priority Data

Jun. 28, 2012 (DE) .......................... 10 2012 211 151

(51) Int. Cl.
*B60L 11/18* (2006.01)
(52) U.S. Cl.
CPC ........... *B60L 11/182* (2013.01); *B60L 11/1829* (2013.01); *B60L 2240/36* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ..................................................... B60L 11/182
USPC .......................................................... 320/108
See application file for complete search history.

(56) References Cited

U.S. PATENT DOCUMENTS

| 3,079,497 A | * | 2/1963 | Remz et al. ............... 246/169 D |
| 3,816,750 A | * | 6/1974 | Liu ............................. 250/338.3 |
| 4,068,811 A | * | 1/1978 | Caulier ..................... 246/169 A |
| 4,214,165 A | * | 7/1980 | Asawa ........................ 250/338.3 |
| 4,661,984 A | * | 4/1987 | Bentley ........................ 382/147 |

(Continued)

FOREIGN PATENT DOCUMENTS

| DE | 102005053111 A1 | 5/2007 |
| DE | 102008013580 A1 | 9/2009 |

(Continued)

OTHER PUBLICATIONS

"Black Body Radiation," Michael Fowler, University of Virginia, Sep. 7, 2008, Accessed Mar. 19, 2015, http://galileo.phys.virginia.edu/classes/252/black_body_radiation.html.*

(Continued)

*Primary Examiner* — Drew A Dunn
*Assistant Examiner* — John Trischler
(74) *Attorney, Agent, or Firm* — Laurence Greenberg; Werner Stemer; Ralph Locher

(57) ABSTRACT

A charging installation for inductively charging an electrical energy storage device of a vehicle, has a vehicle-side coil and a ground-side coil. At least one temperature sensor is disposed in the region of the ground-side coil and at least one heat source is disposed in the region of the vehicle-side coil.

5 Claims, 2 Drawing Sheets

(56) References Cited

U.S. PATENT DOCUMENTS

| | | | |
|---|---|---|---|
| 4,682,179 A * | 7/1987 | Gerharz | 343/755 |
| 4,777,416 A * | 10/1988 | George et al. | 318/568.12 |
| 4,805,854 A * | 2/1989 | Howell | 246/169 D |
| 4,815,008 A * | 3/1989 | Kadonoff et al. | 701/23 |
| 4,844,493 A * | 7/1989 | Kramer | 180/169 |
| 4,852,901 A * | 8/1989 | Beasley et al. | 280/477 |
| 5,079,420 A * | 1/1992 | Turnbull | 250/338.3 |
| 5,416,711 A * | 5/1995 | Gran et al. | 701/117 |
| 5,462,439 A * | 10/1995 | Keith | 320/109 |
| 5,612,668 A * | 3/1997 | Scott | 340/426.13 |
| 5,625,188 A * | 4/1997 | Hori | 250/338.3 |
| 5,821,731 A * | 10/1998 | Kuki et al. | 320/108 |
| 5,942,753 A * | 8/1999 | Dell | 250/338.3 |
| 6,175,114 B1 * | 1/2001 | Hori | 250/338.3 |
| 6,239,577 B1 * | 5/2001 | Koike et al. | 320/108 |
| 6,250,650 B1 * | 6/2001 | Douglas | 280/6.155 |
| 6,313,462 B1 * | 11/2001 | Matsuda et al. | 250/338.3 |
| 6,382,653 B1 * | 5/2002 | Bass | 280/477 |
| 6,803,744 B1 * | 10/2004 | Sabo | 320/108 |
| 7,636,621 B2 * | 12/2009 | Lee et al. | 701/23 |
| 7,732,770 B2 * | 6/2010 | Han et al. | 250/338.3 |
| 8,049,370 B2 * | 11/2011 | Azancot et al. | 307/104 |
| 8,169,182 B1 * | 5/2012 | Kimble | 320/101 |
| 8,305,036 B2 * | 11/2012 | Toya et al. | 320/108 |
| 8,368,348 B2 * | 2/2013 | Reddy | 320/109 |
| 8,483,899 B2 * | 7/2013 | Martin | 701/22 |
| 8,489,315 B2 * | 7/2013 | Yamamoto | 701/123 |
| 8,912,687 B2 * | 12/2014 | Kesler et al. | 307/104 |
| 2001/0006367 A1 * | 7/2001 | Oda | 340/567 |
| 2002/0193908 A1 * | 12/2002 | Parker et al. | 700/258 |
| 2005/0178632 A1 * | 8/2005 | Ross | 191/10 |
| 2006/0006316 A1 * | 1/2006 | Takenaka | 250/221 |
| 2007/0170359 A1 * | 7/2007 | Syllaios et al. | 250/338.1 |
| 2007/0170363 A1 * | 7/2007 | Schimert et al. | 250/353 |
| 2008/0009984 A1 * | 1/2008 | Lee et al. | 701/23 |
| 2008/0185523 A1 * | 8/2008 | Lashley et al. | 250/338.2 |
| 2009/0079386 A1 * | 3/2009 | Gallagher et al. | 320/108 |
| 2010/0076631 A1 * | 3/2010 | Mian | 701/19 |
| 2010/0221701 A1 * | 9/2010 | Osri | 435/5 |
| 2010/0279606 A1 * | 11/2010 | Hillan et al. | 455/41.1 |
| 2011/0074346 A1 | 3/2011 | Hall et al. | |
| 2011/0075835 A1 * | 3/2011 | Hill | 379/418 |
| 2012/0112691 A1 * | 5/2012 | Kurs et al. | 320/108 |
| 2012/0126747 A1 * | 5/2012 | Kiko et al. | 320/109 |
| 2012/0133215 A1 * | 5/2012 | Lai et al. | 307/104 |
| 2012/0187757 A1 | 7/2012 | Wechlin et al. | |
| 2012/0203410 A1 * | 8/2012 | Wechlin et al. | 701/22 |
| 2012/0235636 A1 * | 9/2012 | Partovi | 320/108 |
| 2012/0249066 A1 * | 10/2012 | Ichikawa | 320/109 |
| 2013/0088195 A1 * | 4/2013 | Yoon et al. | 320/108 |
| 2013/0193918 A1 * | 8/2013 | Sarkar et al. | 320/109 |
| 2013/0278212 A1 * | 10/2013 | Kai et al. | 320/108 |
| 2014/0021908 A1 * | 1/2014 | McCool et al. | 320/108 |
| 2014/0021914 A1 * | 1/2014 | Martin et al. | 320/109 |
| 2014/0084859 A1 * | 3/2014 | Hall et al. | 320/108 |

FOREIGN PATENT DOCUMENTS

| | | | |
|---|---|---|---|
| DE | 102009015753 A1 | | 10/2010 |
| DE | 102009033236 A1 | | 1/2011 |
| KR | 20080050278 A | * | 6/2008 |
| WO | 2012047779 A1 | | 4/2012 |

OTHER PUBLICATIONS ("The Measurement, Instrumentation, and Sensors Handbook", John G. Webster, CRC Press and IEEE Press, 1999, p. 32-113.*

Principles of Electronic Materials and Devices ( 3rd Edition, Chapter 7.8: Dielectric Materials and Insulation: Piezoelectricity, Ferroelectricity, and Pyroelectricity, pp. 650-651, McGraw-Hill, 2006.*

Thermal Infrared Sensors: Theory, Optimisation and Practice: Chapter 1 Introduction, pp. 1-2, Published Online Jan. 26, 2011, Accessed Mar. 19, 2015, Wiley Online Library, http://onlinelibrary.wiley.com/doi/10.1002/9780470976913.ch1/pdf.*

"mick: Does Heat give off light or does light give off heat" published 2010, YahooAnswers, accessed Jun. 25, 2015, https://answers.yahoo.com/question/index?qid=20100126072013AAftbTx.*

"Infrared Basics," Protherm, Published Apr. 29, 2011, Accessed Online Jun. 25, 2015, http://web.archive.org/web/20110429201203/http://www.pro-therm.com/infrared_basics.php.*

* cited by examiner

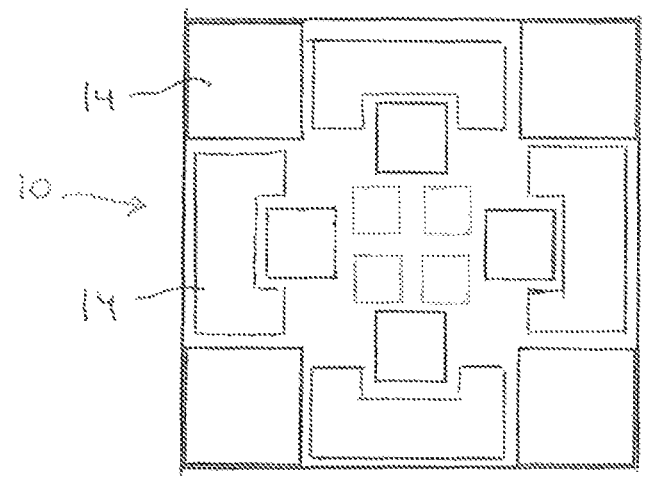
FIG. 4
FIG. 5
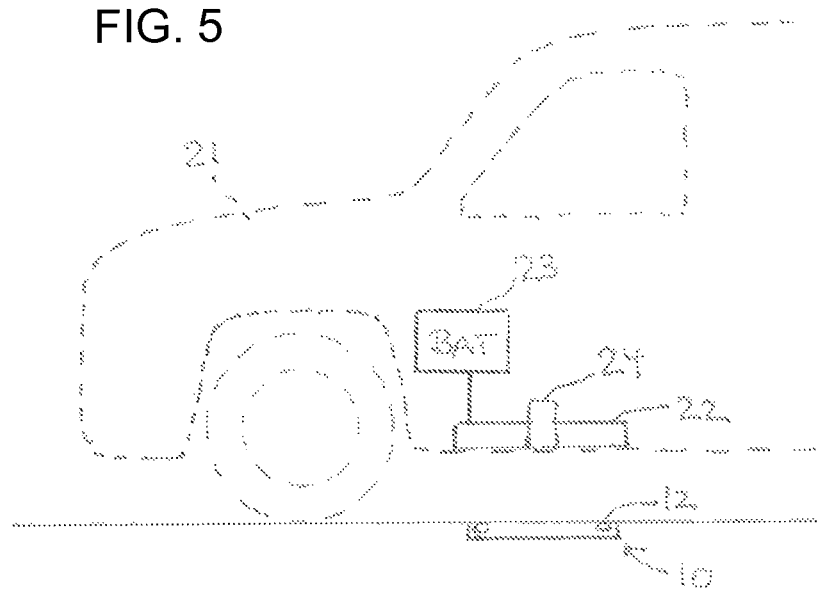

METHOD AND APPARATUS FOR INDUCTIVELY CHARGING THE ENERGY STORAGE DEVICE OF A VEHICLE BY ALIGNING THE COILS USING HEAT SENSORS

CROSS-REFERENCE TO RELATED APPLICATION

This application claims the priority, under 35 U.S.C. §119, of German application DE 10 2012 211 151.4, filed Jun. 28, 2012; the prior application is herewith incorporated by reference in its entirety.

BACKGROUND OF THE INVENTION

Field of the Invention

The invention relates to a charging installation for inductively charging an electrical energy storage device of a vehicle, having a coil the vehicle side and on the road side. The invention also relates to a method for inductively charging an electrical energy storage device and for positioning a vehicle in respect of an inductive charging apparatus on the road side for an electrical energy storage device of the vehicle, wherein a ground-side coil is in line with a coil on the vehicle side and a correct positioning of the vehicle is determined, by a signal being generated by way of a signal outputting apparatus on the vehicle side, which can be received by a receive apparatus on the road side upon correct positioning of the vehicle.

When a vehicle battery is charged inductively, electrical energy is transferred without contact from a coil on the ground side to a coil on the vehicle side. In order to achieve the optimum degree of efficiency during energy transmission, the vehicle must be aligned correctly in respect of the coil on the ground side so that this lines up with the coil on the vehicle side.

In order to assist the driver with the correct positioning of his/her vehicle, systems are known in which the positioning is checked by means of communication from smaller auxiliary coils. One of these is integrated in the coil system on the road side as a transmit coil and another is integrated in the coil system on the vehicle side as a receive coil. The signal transmission between these coils can disadvantageously be disturbed due to the electromagnetic fields of the energy transmission. The evaluation of the signal transmission is also very computationally intensive and requires an efficient computing unit in the vehicle, giving rise to considerable costs.

Methods for ultrasound location are also known. They are, however, likewise problematic on account of their susceptibility to contamination.

German published patent application DE 10 2009 015 753 A1 describes a parking area with an integrated charging function for at least one electric vehicle, wherein the parking area includes at least one parking space which comprises a parking space energy monitoring facility. In this patent the vehicle energy monitoring facility can be movable relative to the vehicle and may even comprise a sensor for detecting the relative position. Such a position sensor can be embodied as an optical or microwave sensor.

Furthermore, German published patent application DE 10 2005 053 111 A1 describes a method for non-contact energy transmission. Corresponding means of position determination can be used to position the energy user. For position determination purposes, an IR transmitter or a thermal imaging camera can be used, with which the site of the lowest change in temperature is detected.

Additionally, a charging apparatus for a vehicle is known from U.S. patent application publication US 2011/0074346 A1 and its counterpart International PCT application publication WO 2012/047779 A1. There, a temperature sensor, with which objects can be detected, can be provided on the vehicle side or road side. U.S. patent application publication US 2012/0187757 A1 and its counterpart German published patent application DE 10 2009 033 236 A1, finally, describe an apparatus for inductively transmitting electrical energy, in which additional temperature sensors are provided, in order to detect a creature which has a higher temperature in comparison with the environment.

SUMMARY OF THE INVENTION

It is accordingly an object of the invention to provide a method and a device for inductively charging which overcome the above-mentioned disadvantages of the heretofore-known devices and methods of this general type and which facilitate the positioning of a vehicle relative to an induction ground-side coil in a simple, reliable and cost-effective manner.

With the foregoing and other objects in view there is provided, in accordance with the invention, a charging installation for inductively charging an electrical energy storage device of a vehicle, wherein a vehicle-side coil is mounted to the vehicle and connected to the electrical energy storage device, the charging installation comprising:

a ground-side coil and at least one temperature sensor disposed in a vicinity of said ground-side coil;

at least one heat source disposed in a vicinity of the vehicle-side coil;

said at least one heat source being configured to be activated at a start of a charging process and said at least one temperature sensor being configured to detect said at least one heat source.

Such a charging installation for inductively charging an electrical energy storage device of a vehicle includes a coil both on the vehicle side and on the floor or ground side for transferring electrical energy.

Provision is made in accordance with the invention for at least one temperature sensor to be arranged in the region of the ground-side coil and at least one heat source to be arranged in the region of the coil on the vehicle side. When a charging process is initiated, the heat source on the vehicle side is activated in the process and detected by means of the temperature sensor on the road side, so that a check can be carried out in a simple and robust manner to determine whether the vehicle is in the correct position.

The temperature sensor is preferably embodied here as a pyroelectric film. Sensors of this type are particularly robust against contamination and other external influences, such as electromagnetic fields arising during charging for instance.

A plurality of temperature sensors are preferably arranged in the region of the ground-side coil, in order thus to enable a particularly good local resolution when detecting the vehicle position.

It is particularly expedient in such cases to arrange the plurality of temperature sensors along a grid around the ground-side coil. It is also advantageous in such cases if the distance between adjacent sensors is all the smaller, the closer these are arranged to the ground-side coil. This makes it possible to detect the vehicle position especially precisely.

In an alternative embodiment of the invention, the temperature sensors can be embodied to be strip-shaped and arranged in two layers one above the other, wherein the main directions of extension of the temperature sensors of the first and second layer enclose an angle of essentially 90° between them. This enables a particularly high local resolution to be achieved with a particularly small number of sensors.

The invention further relates to a method for positioning a vehicle in respect of an inductive charging apparatus on the road side for an electrical energy storage device of the vehicle, wherein a ground-side coil lines up with a coil on the vehicle side and a correct positioning of the vehicle is determined, in which a signal is generated by means of a signal outputting apparatus on the vehicle side, it being possible for said signal to be received by a receive apparatus on the road side with a correct positioning of the vehicle, wherein the at least one heat source is activated at the start of a charging process and is detected by means of the at least one temperature sensor.

Provision is made here in accordance with the invention for a heat source, or thermal source, to be used as a signal outputting apparatus and at least one temperature sensor to be used as a receiving apparatus.

As already mentioned, with the aid of the inventive charging installation it is possible in this way to achieve a particularly robust and cost-effective way of monitoring the correct positioning of the vehicle in respect of the coil on the ground.

It is particularly expedient in such cases to use a plurality of temperature sensors as a receive apparatus, wherein when a signal is received by one of the temperature sensors, a deviation in the position of the vehicle from the target position is determined from the distance of the receiving temperature sensor to the ground-side coil. This makes it possible to check the position of the vehicle especially precisely, wherein, on the basis of the determined distance and/or the determined deviation, corresponding indications to a driver of the vehicle can be generated so that he/she can correct the incorrect positioning.

In a further embodiment of the invention, a plurality of strip-shaped temperature sensors arranged one above the other in two layers is used as a receive apparatus, the main directions of extension of which enclose an angle of 90° between them, wherein when a signal is received by means of a temperature sensor of the first layer and a temperature sensor of the second layer, a deviation in the position of the vehicle from the target position is determined from the distance of the temperature sensors from the ground-side coil.

As already mentioned above, a particularly accurate position determination can thus be realized with a particularly small number of sensors on the road side, so that the costs of additional sensors can be saved without negatively affecting the accuracy.

Other features which are considered as characteristic for the invention are set forth in the appended claims.

Although the invention is illustrated and described herein as embodied in charging installation and method for inductively charging an electrical energy storage device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a schematic representation of an alternative embodiment of the sensor arrangement; and FIG. 5 is a schematic illustration of a vehicle disposed at the inductive charging installation according to the invention.

DETAILED DESCRIPTION OF THE INVENTION

Figure 1:
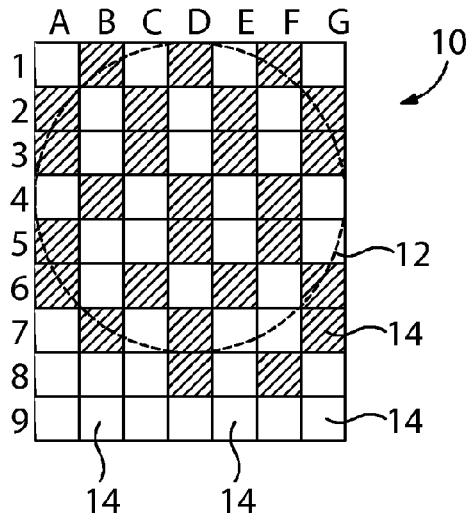
FIG. 1 shows a schematic representation of a ground-side sensor system of an exemplary embodiment of a charging installation according to the invention.

Referring now to the figures of the drawing in detail, in order to facilitate the positioning of a vehicle above an inductive charging system on the ground side, a sensor arrangement 10 is arranged in the region of a charging coil 12 on the ground side. The sensor arrangement 10 consists of a pyroelectric film, which is divided into individual sensor fields 14. For the sake of clarity, not all of the fields are identified. Overall, a matrix comprising 7×9 sensor fields 14 is provided in the embodiments of FIGS. 1 and 2.

A heat source which is activated at the start of the charging process is arranged in the region of an induction coil of a vehicle to be charged. The heat source is ideally attached in the center of the coil on the vehicle side, since the measurement area of the position measuring system is then at its maximum. The heat source can be embodied as a point emitter, area emitter or collimated emitter.

Depending on the position of the vehicle above the coil 12 on the ground side, different sensor fields 14 are irradiated from the heat source, which consequently heat up so that a voltage is present thereacross. This can be easily detected and evaluated for instance by way of an operational amplification circuit having a downstream analog-digital converter in the control device of the inductive charging system.

If a thermal signal 16 is detected in the central sensor field D4, which is located precisely in the center of the coil 12 on the ground side, it is possible to identify that the vehicle is correctly positioned in respect of the charging apparatus. If a signal is not detected in any of the sensor fields 14, the charge enablement is refused. If the thermal signal of the heating apparatus on the vehicle side strikes a sensor field other than the central sensor field D4, the control device identifies that the vehicle is positioned incorrectly. In this case the charging apparatus can provide corresponding displays, which allow the driver to identify how he/she has to correct his/her position so that the coil on the vehicle side lines up with the coil 12 on the ground side.

Figure 2:
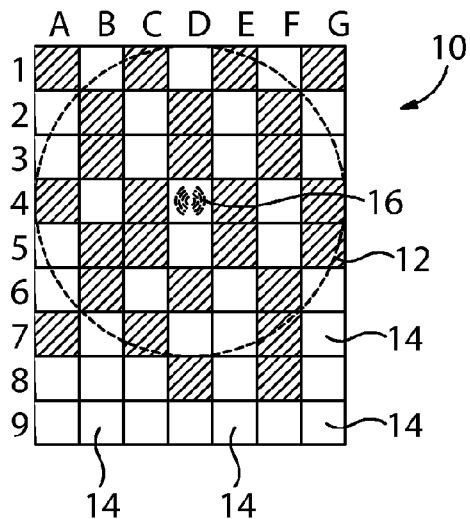
FIG. 2 shows the sensor system according to FIG. 1 when detecting a correctly positioned vehicle.
Figure 3:
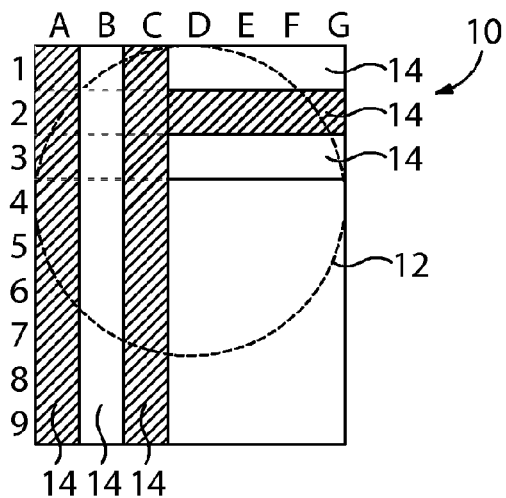
FIG. 3 shows a schematic representation of an alternative sensor arrangement for an exemplary embodiment of an inventive charging installation.

Instead of sensor arrangements 10 shown in FIGS. 1 and 2, which each have a total of 63 individual sensor fields 14 which have to be individually cabled and evaluated, a sensor arrangement, as shown schematically in FIG. 3, can also be used. The sensor fields 14 are embodied here as strips and are arranged one above the other in two layers, wherein the main directions of extension of the strips are essentially at right angles to one another in the two layers.

Such a sensor arrangement 10 manages with a total of 16 sensors, but nevertheless achieves the same local resolution as the sensor arrangements 10 according to FIGS. 1 and 2. A correctly positioned vehicle would here activate the strip-shaped sensor along the column D and the strip-shaped sensor along the column 4, so that it is possible to conclude from the mutual activation of both sensors that the coils are in line with one another.

It is also possible to vary the size of the sensor fields 14 beyond the sensor arrangement 10. Usually a greater resolution is required close to the center of the coil 12 on the ground side than at the boundary area, wherein only recommendations on direction have to be given to the driver, sensors can herewith also be saved, thereby simplifying the structure of the sensor arrangement 10. A exemplary embodiment is illustrated in FIG. 4, showing a grid of differently sized, and even differently designed, temperature sensors 14. In a preferred embodiment, a distance between mutually adjacent sensors is all the smaller, the closer the sensors are arranged to the ground-side coil. This embodiment provides for a more efficient and progressively accurate positioning of the vehicle.

FIG. 5 illustrates a vehicle 21 with a floor-mounted vehicle-side coil 22. The coil 22 is connected to the energy storage device BAT 23 of the vehicle. A heat source 24 is disposed to emit a heat signal towards the ground-side sensors 14 (e.g., the pyroelectric film with the sensor grid). Upon proper positioning of the vehicle, that is, with the coil 22 properly aligned with the coil 12, the charging process may be started for energy exchange between the coils.

A system is thus created overall, which is robust as regards contamination and electromagnetic radiation and at the same times does not require complicated control electronics on account of the purely passive measuring principle. Only a heat source which is very easy to realize is required on the vehicle side. The system is therefore very cost-effective and can consequently enable a high local resolution and thus accurate positioning of the vehicle.

The invention claimed is:

1. A charging installation for inductively charging an electrical energy storage device of a vehicle, wherein a vehicle-side coil is mounted to the vehicle and connected to the electrical energy storage device, the charging installation comprising:

a ground-side coil and a plurality of strip-shaped temperature sensors arranged in first and second layers one above the other, and wherein main directions of extension of the temperature sensors of said first and second layers enclose an angle of approximately 90° therebetween and are disposed in a fixed positional relationship to said ground-side coil;

at least one heat emitting device mounted to the vehicle in a fixed positional relationship to the vehicle-side coil;

said at least one heat emitting device being configured to be activated at a start of a charging process and said at least one temperature sensor being configured to detect said at least one heat emitting device.

2. The charging installation according to claim 1, wherein said temperature sensors are is formed of a pyroelectric film.

3. The charging installation according to claim 1, wherein said plurality of temperature sensors are arranged along a grid around said ground-side coil.

4. The charging installation according to claim 3, wherein a distance between mutually adjacent sensors decreases the closer the sensors are arranged to said ground-side coil.

5. A method of positioning a vehicle in respect of an ground-side inductive charging apparatus for an electrical energy storage device of the vehicle, the method which comprises:

determining whether or not a ground-side coil is in line with a vehicle-side coil, indicating a correct positioning of the vehicle relative to the inductive charging apparatus, by activating a heat emitting device mounted to the vehicle at a start of a charging process for outputting a signal from the heat emitting device;

receiving the signal from said heat emitting device using a plurality of strip-shaped temperature sensors arranged one above the other in two layers as a receiving apparatus, the strip-shaped temperature sensors having main directions of extension enclosing an angle of 90° therebetween them, the temperature sensors being disposed at the ground-side charging apparatus; and upon receiving a signal by way of one of a temperature sensor of the first layer and a temperature sensor of the second layer, determining a deviation in the position of the vehicle from a target position from a distance of the temperature sensors from a ground-side coil of the charging apparatus or determining that the vehicle is correctly positioned if the signal output by the heat emitting device is properly received by the said plurality of strip-shaped temperature sensors.

* * * * *